No. 729,386. PATENTED MAY 26, 1903.
O. P. MÜLLER.
CORN KNIFE.
APPLICATION FILED FEB. 7, 1903.
NO MODEL.
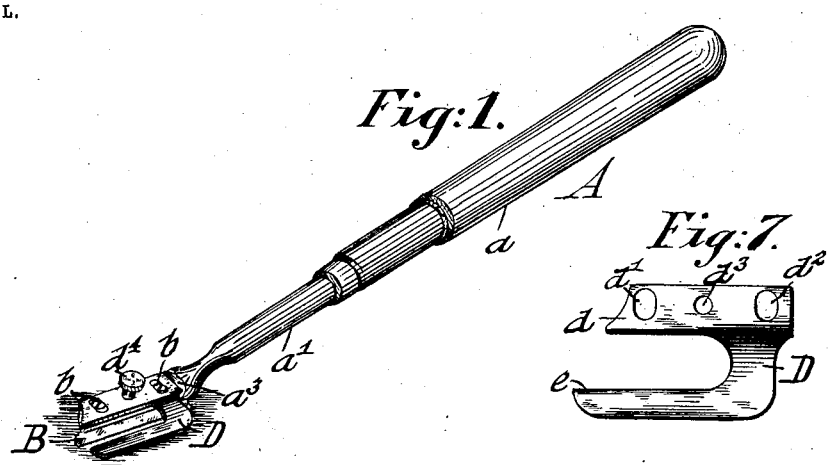
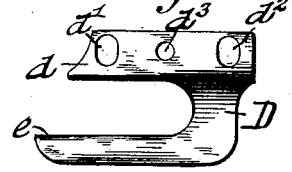
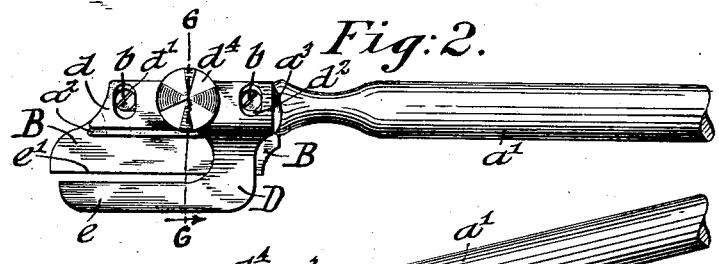
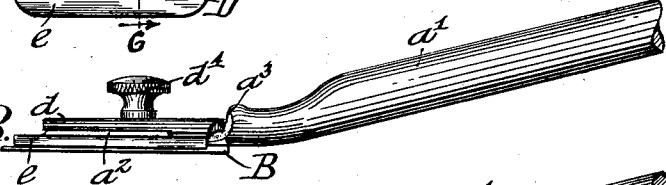
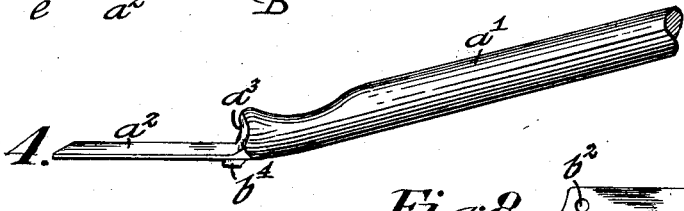
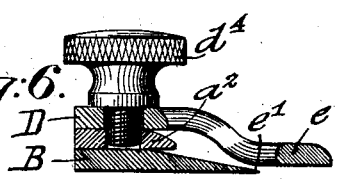
Witnesses:
Henry J. Suhrbier
Fred Hohman
Inventor,
Otto P. Müller,
By his Attorneys
Goepel & Niles.

No. 729,386. Patented May 26, 1903.

UNITED STATES PATENT OFFICE.

OTTO P. MÜLLER, OF NEW YORK, N. Y., ASSIGNOR OF ONE-HALF TO EUGENE J. FUCHS, OF NEW YORK, N. Y.

CORN-KNIFE.

SPECIFICATION forming part of Letters Patent No. 729,386, dated May 26, 1903.

Application filed February 7, 1903. Serial No. 142,347. (No model.)

*To all whom it may concern:*

Be it known that I, OTTO P. MÜLLER, a citizen of the United States, residing in New York, borough of Brooklyn, in the State of New York, have invented certain new and useful Improvements in Corn-Knives, of which the following is a specification.

This invention relates to a knife adapted for removing corns; and the object of the invention is to provide a safe, convenient, and durable device of this nature.

For this purpose the invention consists of a corn-knife comprising a handle, a blade-seat arranged at the outer end of said handle, a blade secured to said seat, a U-shaped guard-plate over said blade, one leg of said U-shaped guard-plate being attached by a suitable thumb-screw to said blade-seat, and the other leg of said U-shaped guard-plate arranged beyond and slightly above the level of the cutting edge of the blade and extending parallel with the same.

The invention consists, further, in certain details of construction and combinations of parts, which will be fully described hereinafter and finally pointed out in the claims.

In the accompanying drawings, Figure 1 is a perspective view of my improved corn-knife. Fig. 2 is a top view of the same on a somewhat larger scale, a portion of the handle being broken away. Fig. 3 is a side elevation of Fig. 2. Fig. 4 is a side elevation showing the parts in Fig. 3 with exception of the knife, guard-plate, and thumb-screw, which are here removed. Fig. 5 is a top view of the parts shown in Fig. 4. Fig. 6 is a vertical transverse section, on a larger scale, on line 6 6, Fig. 2. Fig. 7 is a plan view of the guard-plate, and Fig. 8 is a plan view of the blade.

Similar letters of reference indicate corresponding parts.

Referring to the drawings, A indicates the handle of my improved corn-knife, the upper portion $a$ of which is composed of wood, india-rubber, or other suitable material and the lower portion $a'$ of any suitable metal. The handle is provided at its outer end with a blade-seat $a^2$, arranged, preferably, at an obtuse angle with the handle, as shown, said seat being preferably formed integral with the lower portion of the handle and offset therefrom, as shown, giving thereby to the handle a recessed outer end. The blade B is secured to said blade-seat at the under side of the same by means of two blade-screws $b$, which pass through suitable openings $b'$ in said blade-seat and into corresponding threaded openings $b^2$ in the blade. At its outer or rear corner the blade B is provided with a recess $b^3$. At the lower portion of the handle $a'$—i. e., at the junction of the same with the blade-seat—is provided a shoulder or lug $b^4$, adapted to enter recess $b^3$.

D indicates the U-shaped guard-plate, one leg $d$ of which is provided with three openings $d'$ $d^2$ $d^3$. The openings $d'$ $d^2$ receive the heads of the screws $b$, which heads thereby serve, in connection with a shoulder $a^3$, between the lower end of the handle and the blade-seat, and a thumb-screw $d^4$, to secure the blade against shifting on the blade-seat. The guard-plate is retained upon the upper face of the blade-seat $a^2$, with its open end outermost, by means of a thumb-screw $d^4$, which passes through the opening $d^3$ in the guard and into a tapped opening $d^5$ in the blade-seat. The guard-plate D is of such form that its outer leg $e$ is located laterally beyond the cutting edge $e'$ of the blade, as shown in Fig. 2, slightly above the level of said cutting edge, as shown in Fig. 6, thereby forming a guard-finger.

When using the device, the guard-finger $e$ is rested directly upon the skin, and the blade then cuts at a slight level below the same. Owing to the guard-finger, the blade cannot cut into the flesh, but cuts off a thin layer from the corn. The portions cut off pass up between the guard-finger $d$ and the edge $e'$ into the space between the finger $e$ and leg $d$ of the guard-plate, and, resting on the knife-blade, may be readily lifted and discharged. The openings $b'$ $d'$ $d^2$ are in the form of slots extending laterally of the blade-seat and guard, so as to permit the adjustment of the blade laterally toward or from the guard-finger $e$. The outer end of the blade B projects somewhat beyond the leg or guard-finger $e$, and the outer end of the latter is rounded off, as indicated in Fig. 2. This construction is for the purpose of facilitating the cutting out of the corn itself. When used for this purpose, the rounded outer end of the leg $e$ is rested upon the skin adjacent to the corn, and the device then moved so that the outer end of the blade cuts circularly about the corn, thereby removing the same, while said guard-finger $e$ prevents the too deep cutting in of the blade.

Having thus described my invention, I claim as new and desire to secure by Letters Patent—

1. A corn-knife, consisting of a handle, a blade-seat at the lower end of said handle, a blade connected with said seat, and a U-shaped guard-plate secured to said seat, the outer leg of said guard-plate forming a guard-finger arranged beyond and slightly above, and extending parallel with, the cutting edge of said blade, substantially as set forth.

2. A corn-knife, consisting of a handle, a blade-seat at the lower end of said handle, and extending at an angle therefrom, a blade connected with said seat, and a U-shaped guard-plate secured to said seat, the outer leg of said guard-plate arranged beyond and slightly above, and extending parallel with the edge of the blade, substantially as set forth.

3. A corn-knife, consisting of a handle, a blade-seat at the lower end of the same, a shoulder between said handle and blade-seat at the upper side of the latter, a blade secured at the lower side of said blade-seat, and a guard-plate secured at the upper side of said blade-seat and abutting against said shoulder, substantially as set forth.

4. A corn-knife, consisting of a handle, a blade-seat at the lower end of said handle, a lug or shoulder at the lower side of said blade-seat, a blade at the lower side of said blade-seat and provided with a recess adapted to engage said shoulder, a lug or shoulder at the upper side of said blade-seat between the same and the handle, and a guard-plate secured to said blade-seat at its upper side and engaging said latter shoulder, substantially as set forth.

5. A corn-knife, consisting of a handle, a blade-seat at the lower end of said handle, a blade, screws passing through said blade-seat and securing said blade in position at the lower side of the same, a guard-plate at the upper side of said blade-seat, having a guard-finger extending parallel with the blade, adjacent the cutting edge of the same, and a thumb-screw passing through said guard-plate into said blade-seat and blade, for securing said guard-plate in place, substantially as set forth.

6. A corn-knife, consisting of a handle, a blade-seat at the lower end of said handle, a blade at the lower side of said blade-seat, headed screws passing through said blade-seat and engaging the blade, and provided with upwardly-projecting heads, a guard-plate at the upper side of said blade-seat, and adapted to engage said screw-heads, and means securing said guard-plate removably upon said blade-seat, substantially as set forth.

7. A corn-knife, consisting of a handle, a blade-seat at the lower end of said handle, a lug at the lower side of said blade-seat, a blade at the lower side of said blade-seat and provided with a recess adapted to engage said lug, screws passing through said blade-seat and engaging the blade, and provided with upwardly-projecting heads, a shoulder at the upper side of said blade-seat between the same and the handle, a guard-plate at the upper side of said blade-seat and adapted to engage said screw-heads and shoulder, and a thumb-screw passing through said guard-plate into the blade-seat and the blade, substantially as set forth.

8. A corn-knife, consisting of a handle, a blade-seat at the lower end of the handle, a blade at the lower side of said blade-seat, a U-shaped guard-plate at the upper side of said blade-seat, arranged with its open end outermost, one leg of said guard-plate forming a guard-finger extending parallel with and slightly above the level of the cutting edge of the blade, and a thumb-screw securing the guard-plate on the blade-seat, substantially as set forth.

9. A corn-knife consisting of a handle, a blade-seat at the lower end of the handle, a blade at the lower side of said blade-seat, a U-shaped guard-plate at the upper side of said blade-seat, arranged with its open end outermost, one leg of said guard-plate forming a guard-finger extending parallel with and slightly above the level of the cutting edge of the blade, said blade extending at its outer end slightly beyond said guard-finger, and a thumb-screw securing the guard-plate on the blade-seat, substantially as set forth.

10. A corn-knife, consisting of a handle, a blade-seat at the lower end of said handle, a blade connected with said blade-seat, and a U-shaped guard-plate secured to said blade-seat, the outer leg of said guard-plate forming a guard-finger arranged beyond the cutting edge of said blade and provided with a rounded-off outer end, and the cutting edge of said blade extending longitudinally beyond said rounded-off outer end of said guard-finger, substantially as set forth.

11. A corn-knife, consisting of a handle, a blade-seat at the lower end of said handle, and provided with laterally-extending slots, a blade at the lower side of said handle and seat, blade-screws passing through said slots of the blade-seat and engaging the blade, a guard-plate at the upper side of said blade-seat, provided with laterally-extending slots for the heads of said screws, and having an outer leg or guard-finger extending parallel with the blade, and a thumb-screw securing said guard-plate to said blade-seat, substantially as set forth.

In testimony that I claim the foregoing as my invention I have signed my name in presence of two subscribing witnesses.

OTTO P. MÜLLER.

Witnesses:
 HENRY J. SUHRBIER,
 PAUL GOEPEL.